(12) United States Patent
Ollila et al.

(10) Patent No.: US 7,850,333 B2
(45) Date of Patent: Dec. 14, 2010

(54) PLANAR CIRCUIT FOR DRIVING GAS DISCHARGE LAMPS

(75) Inventors: Mikko Ollila, Tampere (FI); Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 400 days.

(21) Appl. No.: 12/110,805

(22) Filed: Apr. 28, 2008

(65) Prior Publication Data

US 2009/0267512 A1   Oct. 29, 2009

(51) Int. Cl.
*F21V 23/02* (2006.01)
(52) U.S. Cl. .......................... 362/221; 362/3
(58) Field of Classification Search .............. 262/3, 262/221, 296.01
See application file for complete search history.

(56) References Cited

U.S. PATENT DOCUMENTS

| | | | |
|---|---|---|---|
| 3,650,189 A | 3/1972 | Biber | |
| 4,527,098 A | 7/1985 | Owen | |
| 5,604,406 A | 2/1997 | Gaus | |
| 5,651,601 A | 7/1997 | Morisawa | |
| 6,750,916 B1 * | 6/2004 | Isashi et al. | 348/376 |

FOREIGN PATENT DOCUMENTS

| | | |
|---|---|---|
| EP | 0502273 | 9/1992 |
| JP | 2000030880 | 1/2000 |

* cited by examiner

*Primary Examiner*—David V Bruce
(74) *Attorney, Agent, or Firm*—Alfred A. Fressola; Ware, Fressola, Van Der Sluys & Adolphson LLP

(57) ABSTRACT

Gas discharge lamps can be driven with a circuit with a small form factor by an arrangement comprising a planar printed wiring board with at least one coil for driving a gas discharge lamp, wherein a reflector plate of the gas discharge lamp supports the planar printed wiring board.

27 Claims, 4 Drawing Sheets

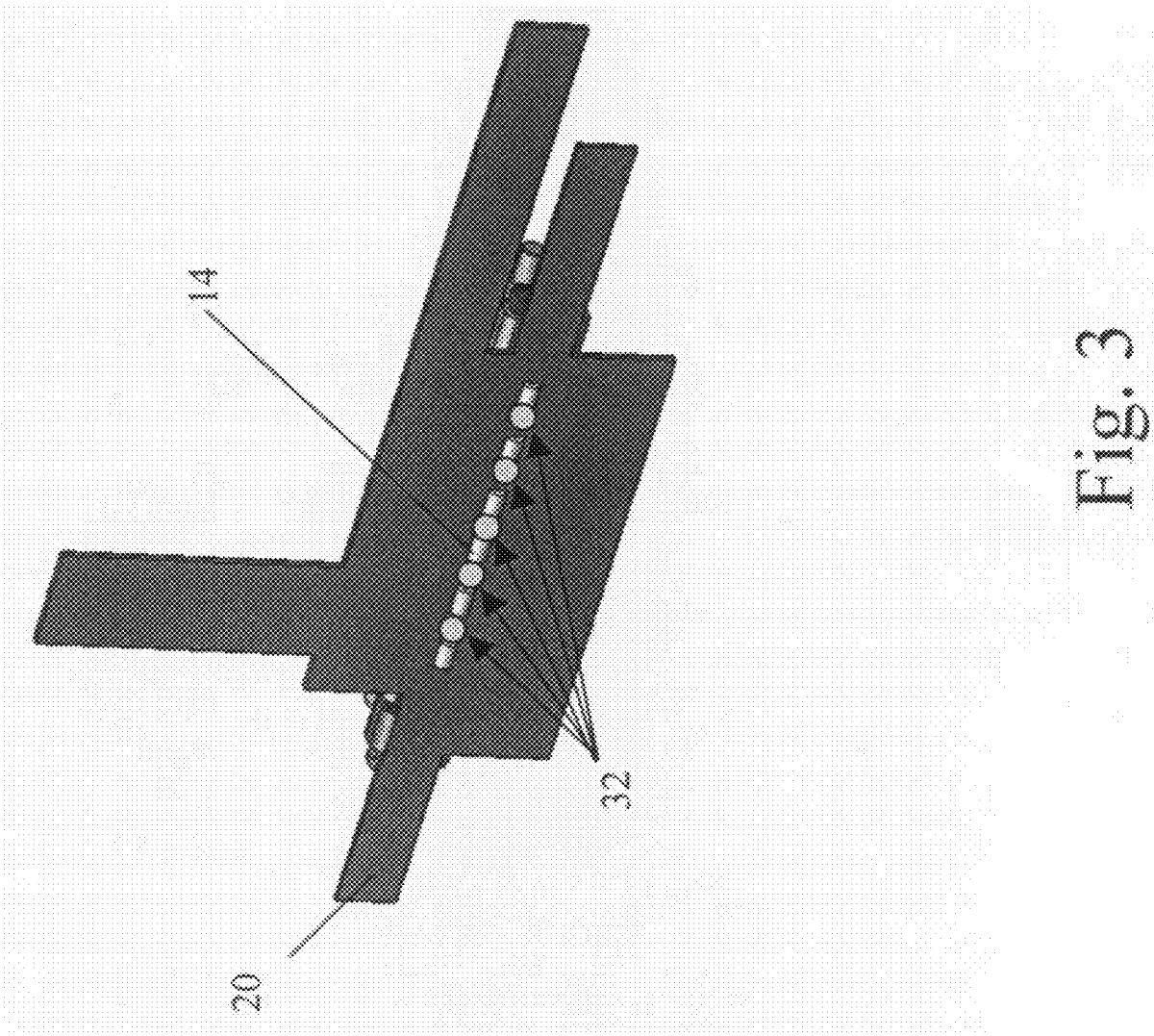

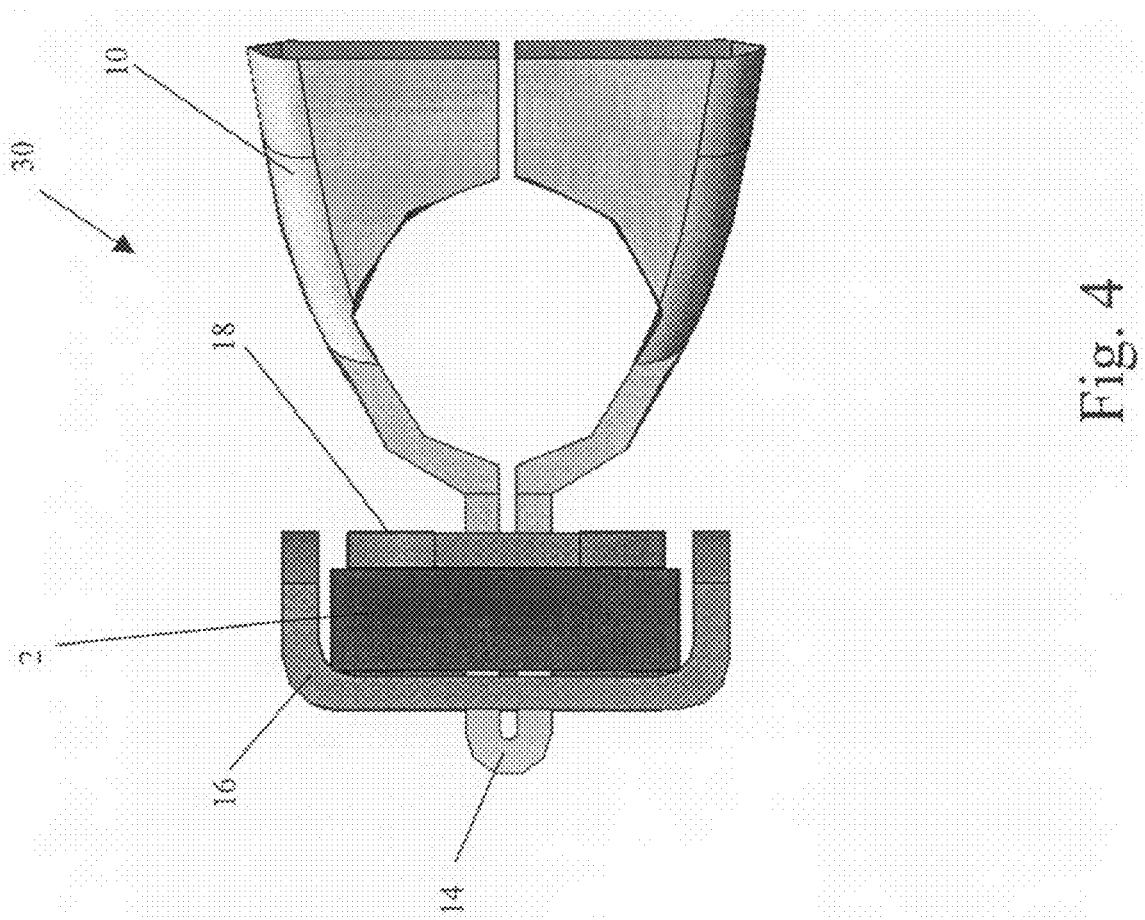

PLANAR CIRCUIT FOR DRIVING GAS DISCHARGE LAMPS

TECHNICAL FIELD

The subject matter relates to an arrangement for driving a gas discharge lamp.

BACKGROUND OF THE INVENTION

Gas discharge lamps, such as xenon lamps, are used, for example, as flash lights in consumer electronic devices, for example, in pocket cameras, mobile phones, PDAs, mobile computers and the like. In particular xenon flash lights are used together with camera modules in these devices. Driving a gas discharge lamp may require at least two transformers within the driving circuit. One transformer may be used for charging a discharge capacitor, the capacitor driving the gas discharge lamp. A second transformer may be used for providing an ignition impulse to the gas discharge lamp. The ignition impulse is used for igniting a gas discharge arc. Upon igniting the discharge arc, the arc is driven by the discharge capacitor.

In view of the requirements for two transformers, the electronic structures required usually take up a large volume. In particular providing a transformer as discrete element on a printed wiring board requires a large volume. However, volume is crucial in mobile applications, in particular in mobile user electronic devices. The trend drives the devices to ever smaller sizes, making prior art drive circuits for discharge lamps futile due to their large size.

SUMMARY OF THE INVENTION

In order to provide for a gas discharge lamp driving circuit, which is small of size and easy to manufacture, the subject matter relates to an arrangement comprising a planar printed wiring board with at least one coil for driving a gas discharge lamp, wherein a reflector plate of the gas discharge lamp supports the coil on the planar printed wiring board.

It has been found that a printed wiring board structure needs to be volume efficient in order to provide for simple and compact structure, but still bearing all support mechanics and all transformers for driving a gas discharge lamp. By supporting the coil and/or the printed wiring board using the reflector plate of the gas discharge lamp, it can be possible to provide for a volume efficient structure, which can provide at the same time two transformers for driving the gas discharge lamp. Using the reflector plate to support the coil, e.g. the inductor, or the transformer coil, on the printed wiring board makes it easy to manufacture the drive circuit and support arrangement for a gas discharge lamp.

The coil can be a planar transformer being placed on the printed wiring board. The printed wiring board can be used to assemble the rest of the electronics, for example the drive integrated circuit, a power integrated circuit, capacitors and the like. The reflector plate of the gas discharge lamp can be used to support the inductor on the printed wiring board. The result is a structure with only few discrete components needed, making it easy and cheap to manufacture. The coil can be etched onto the printed wiring board, or may be bonded to it.

According to an embodiment, the reflector plate may have at least one protrusion protruding the printed wiring board such that at least one coil perimeters the at least one protrusion. The protrusions of the reflector plate can form the core of at least one transformer. When providing the coil on the printed wiring board and the core being provided by the protrusions, transformer characteristics of the transformer can be improved. The coil perimetering the protrusion may be one single coil, or more than one coil, e.g. two or more coils perimetering only one protrusion.

According to a further embodiment, the first coil may operate as a charge transformer for charging a discharge capacitor for driving the gas discharge lamp. A first transformer can be used as charge transformer, which may be necessary for driving the gas discharge lamp. When providing a first coil on the printed wiring board as charge transformer, the printed wiring board can provide charging the discharge capacitor, which can also be arranged on the printed wiring board at small size.

According to a further embodiment, a second coil may operate as a trigger transformer for providing an ignition impulse to the gas discharge lamp in response to a discharge of a discharge capacitor. A trigger transformer can provide for a high current for a short duration to ignite the gas within the gas discharge lamp and to initiate an ignition arc, which is then driven by the charges from the discharge capacitor.

Providing a charge transformer and a trigger transformer both on the printed wiring board may allow for driving the gas discharge lamp using only discrete components on the printed wiring board. In particular the coils on the printed wiring board together with the protrusions of the reflector plate can form finger-formed cores of a planar transformer. For example, the protrusions of the reflector plate can form E-tapped cores of the planar transformers. The coils can be provided on the printed wiring board with a large foot print, but low height. This allows for reducing the overall size of the arrangement. The reflector plate may be used to support the inductor and can be part of the magnetic circuit, if build from magnetic material.

According to embodiments, the at least one coil may be made from planar windings arranged on at least one side of the printed wiring board. The windings may be etched onto the printed wiring board. Providing planar windings on at least one side of the printed wiring board allows for reducing the overall size of the arrangement.

In order to prevent creation of eddy currents, the at least one protrusion of the reflector plate may be made from metal sheets.

To reduce flux leakage, embodiments provide for protrusions of the reflector plate being made from paramagnetic material. Paramagnetic material may, for example, have a permeability much greater than 1 (>>1). Furthermore, in order to keep the magnetic flux within the transformer core, at least one metal piece may electrically contact the at least one protrusion according to embodiments. Connecting the protrusions with each other through the metal piece may provide for keeping the magnetic flux substantially in the core.

For example, embodiments provide at least one first metal piece being arranged at a side of the printed wiring board opposing the reflector plate. The side facing away from the reflector plate may be the side where the first metal piece is arranged.

The finger tips of the protrusions may thus be connected with each other, thus the first metal piece may close the magnetic circuit of the transformer core. Closing the magnetic circuit may be provided for by connecting the protrusion to the metal plate at the first side, according to embodiments.

In order to further close the magnetic circuit in the transformer circuit, embodiments provide at least one second metal piece being arranged at the side of the printed wiring board facing the reflector plate.

In order to keep the size of the magnetic core small, the at least one metal piece is a flat metal plate according to embodiments.

In order to reduce eddy currents in the transformer core, the at least one flat metal plate may be made from metal sheets according to embodiments.

In order to reduce leakage loses, embodiments provide for the at least one metal piece being made from ferromagnetic material. The permeability of this material may be much greater than 1 ($>>1$).

At least two protrusions of the reflector plate may, according to embodiments, be formed comb-shaped. This allows for providing two cores of planar transformers, which have an E-shape.

In order to further increase the component integration, embodiments provide for attaching a flexible printed circuit to the first metal piece. Attaching the flexile printed circuit to the first metal piece allows for increasing the number of discrete components within the drive circuit for the gas discharge lamp.

In order to bring the flexible printed circuit as closed as possible to the first metal piece, it may, according to embodiments, have openings taking up the protrusions.

In order to shield the printed wiring board and its discrete components, the first metal piece may be U-shaped for taking up at least the printed wiring board.

Another aspect is a lighting device with an arrangement comprising a planar printed wiring board with at least one coil for driving a gas discharge lamp, wherein a reflector plate of a gas discharge lamp supports the coil on the planar printed wiring board and a gas discharge lamp.

According to embodiments, the gas discharge lamp may be a xenon gas lamp.

According to further embodiments, the gas discharge lamp may be a flash bulb. This allows for using the lighting device as flashing device in camera applications.

According to a further aspect, there is provided a consumer electronic device with a lighting device as described above and a camera module.

A further aspect is an arrangement comprising wiring means comprising at least one inductor means for driving a lighting means, wherein the wiring means are flat, wherein a reflector means of the lighting means supports the inductor means of the wiring means.

According to embodiments, the reflector means has at least one protrusion protruding the wiring means such that at least one inductor means perimeters the at least protrusion.

Embodiments provide such an arrangement, wherein a first inductor means is arranged for charging a discharge means for driving a lighting means, and a second inductor means is arranged for providing an ignition impulse to the lighting means in response to a discharge of the discharge means.

The wiring means may, for example, be an integrated circuit, such as for example a printed wiring board or a flexible printed wiring board, or a microprocessor. The inductor means may, for example, be a coil or the like. The reflector means may be a take up for the lighting means, such as for example a socket, a bulb fitting, holder, socket, a carrier, a base, or the like. The inductor means may, for example, be a coil of a transformer. This discharge means may, for example, be a capacitance, such as a capacitor. The lighting means may, for example, be a gas discharge lamp, such as for example a xenon discharge lamp.

According to a further aspect, there is provided a method comprising building a planar printed wiring board with at least one coil, and arranging the planar printed wiring board on a reflector plate of the gas discharge lamp for supporting the at least one coil of the planar printed wiring board.

Embodiments provide such a method further comprising assembling on top of each other, the reflector plate with at least one protrusion, a second metal piece with openings for the protrusions, a printed wiring board with opening for the protrusions and at least one coil perimetering the protrusions, and a first metal piece with openings for the protrusions, wherein the protrusion is electrically connected to the first metal piece.

It is to be understood that all presented exemplary embodiments may be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

FIG. 3 a view onto an arrangement with a flexible printed wiring board according to embodiments of the invention;

FIG. 4 a side view onto an arrangement according to embodiments of the invention.

DETAILED DESCRIPTION OF THE DRAWINGS

Figure 1:
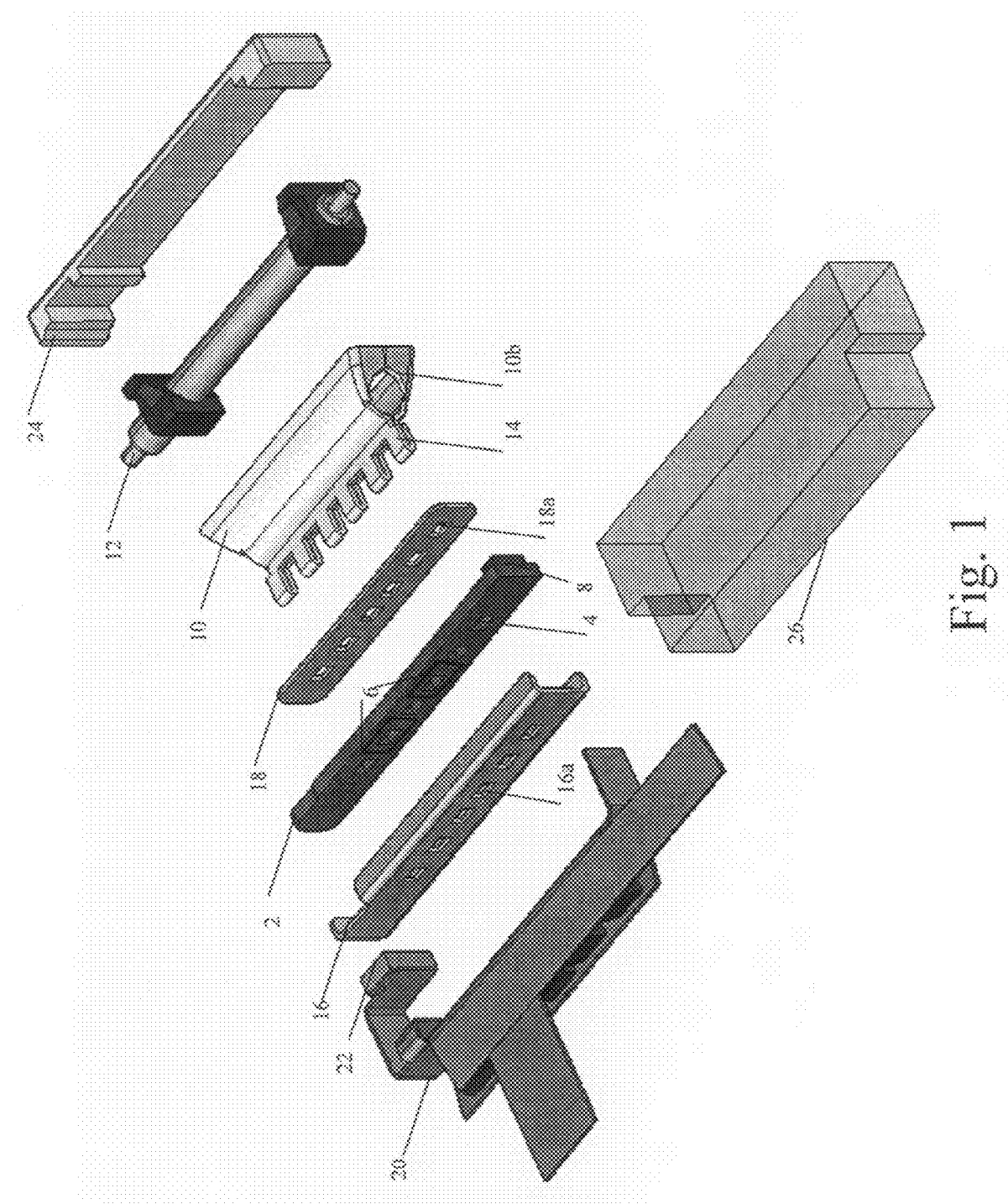
FIG. 1 an exploded view of an arrangement according to embodiments of the invention.

FIG. 1 illustrates a printed wiring board 2 with openings 4. Perimetering the openings 4 are arranged at least two planar coils 6. Further, discrete components (not illustrated) are arranged on the printed wiring board 2. In addition, arranged on printed wiring board 2 may be a large scale integrated component 8, for example for providing drive electronics.

Further illustrated is a reflector plate 10 of a gas discharge lamp 12. The reflector plate 10 has protrusions 14 facing in direction of the printed wiring board 2. The protrusions 14 may be formed comb-shaped as can be seen. The reflector plate 10 can have sockets 10b for taking up the gas discharge lamp 12. The gas discharge lamp 12 can, for example, be a xenon gas discharge lamp.

The reflector plate 10, at least the protrusions 14, can be made of metal sheets with high permeability ($>>1$).

On the side opposing the reflector plate 10 of the printed wiring board 2 may be provided a first metal plate 16. The first metal plate 16 may have openings 16a corresponding to the openings 4 of the printed wiring board 2.

On the side facing the reflector plate 10 of the printed wiring board 2 may be arranged a second metal plate 18. The second metal plate 18 may have openings 18a corresponding to the openings 4 in the printed wiring board 2. The openings 18a, 4, 16a are arranged such that they can take up the protrusions 14. On the side of the first metal plate 16 may be provided a flexible printed circuit with electronics 20. This circuit may take up drive electronics, which cannot be provided on the printed wiring board 2. Further, an ambient light sensor 22 may be provided, for luminance measurements.

Eventually, a front window, for example a glass plate or a transparent plastic plate 24 may be provided. The elements 2-24 may be cast within a housing 26. The elements 2-24 may be molded within housing 26.

Figure 2:
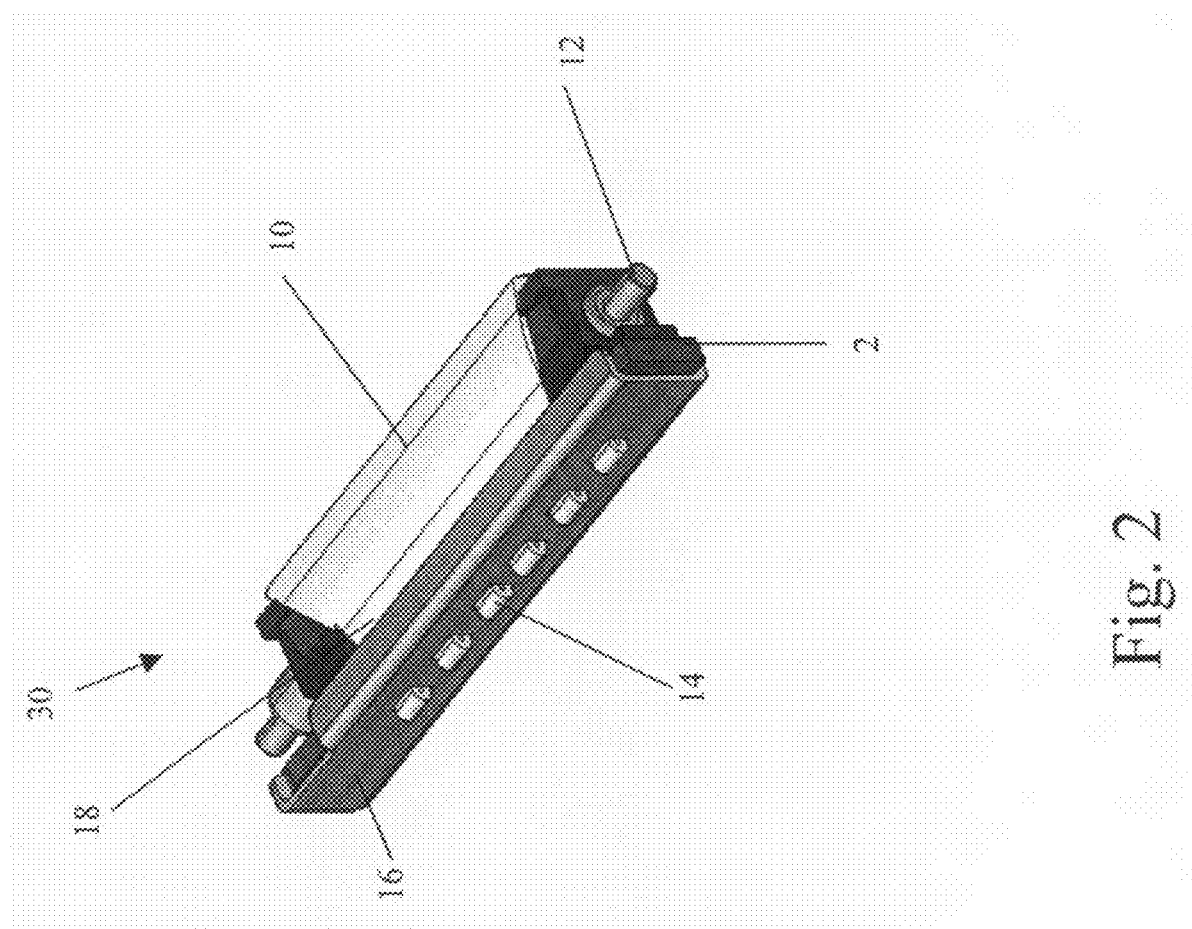
FIG. 2 an view onto an assembled arrangement according to embodiments of the invention.

FIG. 2 illustrates an assembled arrangement 30 with the elements 16, 2, 18, 10, 12. The elements are arranged such that the protrusions 14 are electrically connected to each other by the first metal plate 16 on the side opposing the reflector plate 10 and by the second metal plate 18. This closes the magnetic circuit building up a magnetic core. When the coils 6 are arranged such that they perimeter the openings 4, the coils perimeter in the assembled state the protrusion 14. Thus, two coils 6 (FIG. 1), and two protrusions 14 make up a transformer. The transformer core is made up of protrusion 14, metal plate 16, protrusion 14, and metal plate 18. The magnetic flux flows through these components when the coils 6 have changing current. By providing the metal plates 16, 18, as well as the protrusions 14 with metal sheets, eddy currents can be reduced. By electrically connecting the protrusions 14 to the metal plates 16, 18, the magnetic circuits are closed, thus reducing flux leakage.

The assembly 30 can be created by first building the printed wiring board 2 with the openings 4, and coils 6. In a next step, the metal plates 16, 18 can be arranged on either side of the printed wiring board, such that the openings 16a, 18a correspond with the openings 4. The protrusions 14 can be arranged within the openings 16a, 4, 18a in a next step. Afterwards, the flexible printed circuit 20 can be arranged on the metal plate 16.

Such an arrangement is illustrated in FIG. 3. As can be seen, on the back side of the printed circuit 20, bond pads 32 can be arranged, both fixing the flexible printed circuit 20 to the protrusions 14 and further bringing the protrusions 14 into electrical contact with the first metal plate 16 and fixing the protrusions 14 to the metal plate 16, by, for example a high permeability glue.

In a next step, the assembled elements can be cast into housing 26 (FIG. 1) and for example be overmolded. A discharge lamp 12 together with the front window 24 can be placed on top of the reflector plate 10, thus completing the lighting device.

FIG. 4 illustrates a side view onto an arrangement 30. As can be seen, the reflector plate 10 can be formed from a metal plate or a plurality of metal plates. The form of the reflector plate 10 with the protrusions 14 can be made by drawing. Protrusions are formed U-shaped to fit into the openings 16a, 4, 18a. The first metal plate 16 can be U-shaped, taking up at least the printed wiring board 2. On the side facing the reflector plate 10 of the printed wiring board 2, the second metal plate 18 can be placed. The first metal plate can be in contact with the second metal plate, or there can be an air gap. In the latter case, there will be no magnetic saturation in the magnetic circuit.

The illustrated assembly is small in size and provides for transformers for driving the gas discharge lamp being placed into the socket of the reflector plate 10.

By providing the arrangement as described above, a lighting device can be provided with a small form factor at the same time being capable of using a gas discharge lamp.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. An arrangement comprising:
a planar printed wiring board with at least one coil configured to drive a gas discharge lamp,
wherein a reflector plate of a gas discharge lamp supports the coil on the planar printed wiring board.

2. The arrangement of claim 1, wherein the reflector plate has at least one protrusion protruding the printed wiring board such that at least one coil perimeters the at least one protrusion.

3. The arrangement of claim 2, wherein at least the protrusion of the reflector plate is made from metal sheets.

4. The arrangement of claim 2, wherein at least the protrusion of the reflector plate is made from ferromagnetic material with a permeability greater than 1.

5. The arrangement of claim 2, wherein at least one metal piece contacts the at least one protrusion.

6. The arrangement of claim 5, wherein at least one first metal piece is arranged at least at a side of the printed wiring board opposing the reflector plate.

7. The arrangement of claim 6, wherein the protrusion is connected to the metal plate at the first side.

8. The arrangement of claim 6, wherein a flexible printed circuit is attached to the first metal piece.

9. The arrangement of claim 8, wherein the flexible printed circuit has openings taking up the protrusions.

10. The arrangement of claim 6, wherein the first metal piece is U-shaped for taking up at least the printed wiring board.

11. The arrangement of claim 5, wherein at least one second metal piece is arranged at least at the side of the printed wiring board facing the reflector plate.

12. The arrangement of claim 5, wherein the at least one metal piece is a flat metal plate.

13. The arrangement of claim 12, wherein the at least one flat metal plate is made from metal sheets.

14. The arrangement of claim 5, wherein the at least one metal piece is made from ferromagnetic material with a permeability greater than 1.

15. The arrangement of claim 2, wherein at least two protrusions of the reflector plate are formed comb-shaped.

16. The arrangement of claim 1, wherein a first coil operates as a charge transformer configured to charge a discharge capacitor configured to drive the gas discharge lamp.

17. The arrangement of claim 1, wherein a second coil operates as a trigger transformer configured to provide an ignition impulse to the gas discharge lamp in response to a discharge of a discharge capacitor.

18. The arrangement of claim 1, wherein the at least one coil is made from planar windings arranged on at least one side of the printed wiring board.

19. A lighting device with an arrangement of claim 1 and a gas discharge lamp.

20. The lighting device of claim 19, wherein the gas discharge lamp is a xenon gas lamp.

21. The lighting device of claim 19, wherein the gas discharge lamp is a flash bulb.

22. A consumer electronic device comprising a lighting device of claim 19 and a camera module.

23. An arrangement comprising:
wiring means comprising at least one inductor means for driving a lighting means, wherein the wiring means are flat,
wherein a reflector means of the lighting means supports the inductor means on the wiring means.

24. The arrangement of claim 23, wherein the reflector means has at least one protrusion protruding the wiring means such that at least one inductor means perimeters the at least one protrusion.

25. The arrangement of claim 23, wherein a first inductor means is arranged for charging a discharge means for driving a lighting means, and a second inductor means is arranged for providing an ignition impulse to the lighting means in response to a discharge of the discharge means.

26. A method comprising:
building a planar printed wiring board with at least one coil,
arranging the planar printed wiring board on a reflector plate of a gas discharge lamp configured to support the coil on the planar printed wiring board.

27. The method of claim 26, further comprising
assembling on top of each other
the reflector plate with at least one protrusion,
a second metal piece with openings for the protrusion,
the printed wiring board with openings for the protrusion and at least one coil perimetering the protrusion, and
a first metal piece with openings for the protrusion,
wherein the protrusion is electrically connected to the first metal piece.

* * * * *